(12) United States Patent
Roy et al.

(10) Patent No.: US 10,886,994 B2
(45) Date of Patent: Jan. 5, 2021

(54) LOW COMPLEXITY BEAMFORMING WITH COMPRESSED FEEDBACK

(71) Applicant: Marvell World Trade Ltd., St. Michael (BB)

(72) Inventors: Sayak Roy, Kolkata (IN); Ankit Sethi, Yerwada (IN); Sudhir Srinivasa, Los Gatos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/594,856

(22) Filed: Oct. 7, 2019

(65) Prior Publication Data
US 2020/0044718 A1 Feb. 6, 2020

Related U.S. Application Data

(63) Continuation of application No. 15/844,274, filed on Dec. 15, 2017, now Pat. No. 10,439,701.

(60) Provisional application No. 62/435,667, filed on Dec. 16, 2016.

(51) Int. Cl.
*H04B 7/06* (2006.01)
*H04B 7/0417* (2017.01)

(52) U.S. Cl.
CPC ......... *H04B 7/0663* (2013.01); *H04B 7/0417* (2013.01); *H04B 7/0617* (2013.01); *H04B 7/0634* (2013.01)

(58) Field of Classification Search
CPC .................................................. H04B 7/0663
USPC ....................................................... 375/267
See application file for complete search history.

(56) References Cited

U.S. PATENT DOCUMENTS

| 8,270,909 | B2 | 9/2012 | Zhang et al. |
| 8,331,471 | B1* | 12/2012 | Duarte ................. H04B 7/0478 375/267 |
| 8,483,761 | B2 | 7/2013 | Li et al. |
| 8,982,980 | B2 | 3/2015 | Zhang |
| 9,106,295 | B1 | 8/2015 | Zhang et al. |

(Continued)

OTHER PUBLICATIONS

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

(Continued)

*Primary Examiner* — Lihong Yu

(57) ABSTRACT

A first communication device calculates an initial matrix from an estimate of a communication channel, and performs a matrix decomposition of the initial matrix to decompose the initial matrix into a plurality of decomposition matrices. Performing the matrix decomposition comprises determining angles for rotation operations performed on the initial matrix as part of decomposing the initial matrix. The first communication device determines compressed feedback using the angles that were determined as part of decomposing the initial matrix into the plurality of decomposition matrices. The compressed feedback is a compressed representation of a beamforming steering matrix corresponding to the estimate of the communication channel. The first communication device transmits the compressed feedback to a second communication device to enable the second communication device to beamform at least one subsequent transmission to the first communication device.

20 Claims, 16 Drawing Sheets

(56) References Cited

U.S. PATENT DOCUMENTS

| | | | |
|---|---|---|---|
| 9,166,660 | B2 | 10/2015 | Chu et al. |
| 9,166,836 | B1 | 10/2015 | Sarrigeorgidis et al. |
| 9,258,042 | B1 | 2/2016 | Nabar et al. |
| 9,629,128 | B2 | 4/2017 | Srinivasa et al. |
| 9,712,215 | B1 | 7/2017 | Lee et al. |
| 2007/0177732 | A1 | 8/2007 | Schotten et al. |
| 2007/0226287 | A1* | 9/2007 | Lin .................. H04B 7/0478 708/490 |
| 2008/0019457 | A1 | 1/2008 | Waters et al. |
| 2008/0187061 | A1 | 8/2008 | Pande et al. |
| 2010/0182198 | A1* | 7/2010 | Wen ................ H04L 25/03949 342/373 |
| 2011/0261708 | A1 | 10/2011 | Grandhi |
| 2016/0173682 | A1 | 6/2016 | Lu et al. |
| 2017/0230150 | A1* | 8/2017 | Koo .................. H04B 7/0452 |
| 2018/0175928 | A1 | 6/2018 | Roy et al. |

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages. (Nov. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE Std 802.11-REVmc™/D8.0 (revision of IEEE Std. 802.11TM-2012) "Draft Standard for Information technology—Telecommunications and information exchange between systems—Local and metropolitan area networks - Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Love et al., "An Overview of Limited Feedback in Wireless Communication Systems," IEEE J. on Selected Areas in Communications, vol. 26, No. 8, pp. 1341-1365 (Oct. 2008).

International Search Report and Written Opinion in International Patent Application No. PCT/US2017/066786, dated Mar. 28, 2018 (11 pages).

International Preliminary Report on Patentability in International Patent Application No. PCT/US2017/0066786, dated Jun. 18, 2019 (7 pages).

* cited by examiner $$P_1 = \begin{bmatrix} e^{-j\varphi_1} & 0 & 0 & 0 \\ 0 & e^{-j\varphi_{21}} & 0 & 0 \\ 0 & 0 & e^{-j\varphi_{31}} & 0 \\ 0 & 0 & 0 & e^{-j\varphi_{41}} \end{bmatrix}$$

$$P_2 = \begin{bmatrix} 1 & 0 & 0 & 0 \\ 0 & e^{-j\varphi_{22}} & 0 & 0 \\ 0 & 0 & e^{-j\varphi_{32}} & 0 \\ 0 & 0 & 0 & e^{-j\varphi_{42}} \end{bmatrix}$$

$$P_3 = \begin{bmatrix} 1 & 0 & 0 & 0 \\ 0 & 1 & 0 & 0 \\ 0 & 0 & e^{-j\varphi_{33}} & 0 \\ 0 & 0 & 0 & e^{-j\varphi_{43}} \end{bmatrix}$$

*FIG. 7B*

$$G_{21} = \begin{bmatrix} \cos(\psi_{21}) & \sin(\psi_{21}) & 0 & 0 \\ -\sin(\psi_{21}) & \cos(\psi_{21}) & 0 & 0 \\ 0 & 0 & 1 & 0 \\ 0 & 0 & 0 & 1 \end{bmatrix}$$

$$G_{31} = \begin{bmatrix} \cos(\psi_{31}) & 0 & \sin(\psi_{31}) & 0 \\ 0 & 1 & 0 & 0 \\ -\sin(\psi_{31}) & 0 & \cos(\psi_{31}) & 0 \\ 0 & 0 & 0 & 1 \end{bmatrix}$$

$$G_{41} = \begin{bmatrix} \cos(\psi_{41}) & 0 & 0 & \sin(\psi_{41}) \\ 0 & 1 & 0 & 0 \\ 0 & 0 & 1 & 0 \\ -\sin(\psi_{41}) & 0 & 0 & \cos(\psi_{41}) \end{bmatrix}$$

$$G_{32} = \begin{bmatrix} 1 & 0 & 0 & 0 \\ 0 & \cos(\psi_{32}) & \sin(\psi_{32}) & 0 \\ 0 & -\sin(\psi_{32}) & \cos(\psi_{32}) & 0 \\ 0 & 0 & 0 & 1 \end{bmatrix}$$

$$G_{42} = \begin{bmatrix} 1 & 0 & 0 & 0 \\ 0 & \cos(\psi_{42}) & 0 & \sin(\psi_{42}) \\ 0 & 0 & 1 & 0 \\ 0 & -\sin(\psi_{42}) & 0 & \cos(\psi_{42}) \end{bmatrix}$$

$$G_{43} = \begin{bmatrix} 1 & 0 & 0 & 0 \\ 0 & 1 & 0 & 0 \\ 0 & 0 & \cos(\psi_{43}) & \sin(\psi_{43}) \\ 0 & 0 & -\sin(\psi_{43}) & \cos(\psi_{43}) \end{bmatrix}$$

FIG. 7C

$$\varphi_{11} = \text{angle}(c_{11}^1) \quad \varphi_{21} = \text{angle}(c_{21}^1) \quad \varphi_{31} = \text{angle}(c_{31}^1) \quad \varphi_{41} = \text{angle}(c_{41}^1)$$

$$\varphi_{22} = \text{angle}(c_{22}^5) \quad \varphi_{32} = \text{angle}(c_{32}^5) \quad \varphi_{42} = \text{angle}(c_{42}^5)$$

$$\varphi_{33} = \text{angle}(c_{33}^8) \quad \varphi_{43} = \text{angle}(c_{43}^8)$$

*FIG. 7D*

$$\psi_{21} = \text{angle}(r_{11}^2 + jr_{21}^2) \quad \psi_{31} = \text{angle}(r_{11}^3 + jr_{31}^3) \quad \psi_{41} = \text{angle}(r_{11}^4 + jr_{41}^4)$$

$$\psi_{32} = \text{angle}(r_{22}^6 + jr_{32}^6) \quad \psi_{42} = \text{angle}(r_{22}^7 + jr_{42}^7)$$

$$\psi_{43} = \text{angle}(r_{33}^9 + jr_{43}^9)$$

*FIG. 7E*

$$\phi_{11} = (\varphi_{11} - \varphi_{41}) \quad \phi_{21} = (\varphi_{21} - \varphi_{41}) \quad \phi_{31} = (\varphi_{31} - \varphi_{41})$$

$$\phi_{22} = (\varphi_{22} - \varphi_{42}) \quad \phi_{32} = (\varphi_{32} - \varphi_{42})$$

$$\phi_{33} = (\varphi_{33} - \varphi_{43})$$

*FIG. 7F*

LOW COMPLEXITY BEAMFORMING WITH COMPRESSED FEEDBACK

CROSS-REFERENCES TO RELATED APPLICATIONS

This application is a continuation of U.S. patent application Ser. No. 15/844,274, now U.S. Pat. No. 10,439,701, entitled "Low Complexity Beamforming with Compressed Feedback," filed on Dec. 15, 2017, which claims the benefit of U.S. Provisional Patent Application No. 62/435,667, entitled "Low Complexity Methods and Systems for Beamforming with Compressed Feedback," filed on Dec. 16, 2016. All of the applications referenced above are incorporated herein by reference in their entireties.

FIELD OF THE DISCLOSURE

The present disclosure relates generally to communication networks and, more particularly, beamforming in communication networks.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard, now under development, promises to provide even greater throughput, such as throughputs in the tens of Gbps range.

SUMMARY

In an embodiment, a method for providing beamforming information in a communication channel includes: calculating, at a first communication device, an initial matrix from an estimate of the communication channel; performing, at the first communication device, a matrix decomposition of the initial matrix to decompose the initial matrix into a plurality of decomposition matrices, wherein performing the matrix decomposition comprises determining angles for rotation operations performed on the initial matrix as part of decomposing the initial matrix; determining, at the first communication device, compressed feedback using the angles that were determined as part of decomposing the initial matrix into the plurality of decomposition matrices, wherein the compressed feedback is a compressed representation of a beamforming steering matrix corresponding to the estimate of the communication channel; and transmitting, by the first communication device, the compressed feedback to a second communication device to enable the second communication device to beamform at least one subsequent transmission to the first communication device.

In another embodiment, a first communication device comprises a network interface device having one or more integrated circuits (ICs). The one or more ICs are configured to: calculate an initial matrix from an estimate of a communication channel; perform a matrix decomposition of the initial matrix to decompose the initial matrix into a plurality of decomposition matrices, wherein performing the matrix decomposition comprises determining angles for rotation operations performed on the initial matrix as part of decomposing the initial matrix; determine compressed feedback using the angles that were determined as part of decomposing the initial matrix into the plurality of decomposition matrices, wherein the compressed feedback is a compressed representation of a beamforming steering matrix corresponding to the estimate of the communication channel; and transmit the compressed feedback to a second communication device to enable the second communication device to beamform at least one subsequent transmission to the first communication device.

BRIEF DESCRIPTION OF THE DRAWINGS

FIGS. 7A-7F are diagrams illustrating various operations performed to jointly determine a steering matrix and compressed feedback that represents the steering matrix by decomposing a 4×4 matrix, according to an embodiment in which a channel includes four spatial streams.

DETAILED DESCRIPTION

Figure 1:
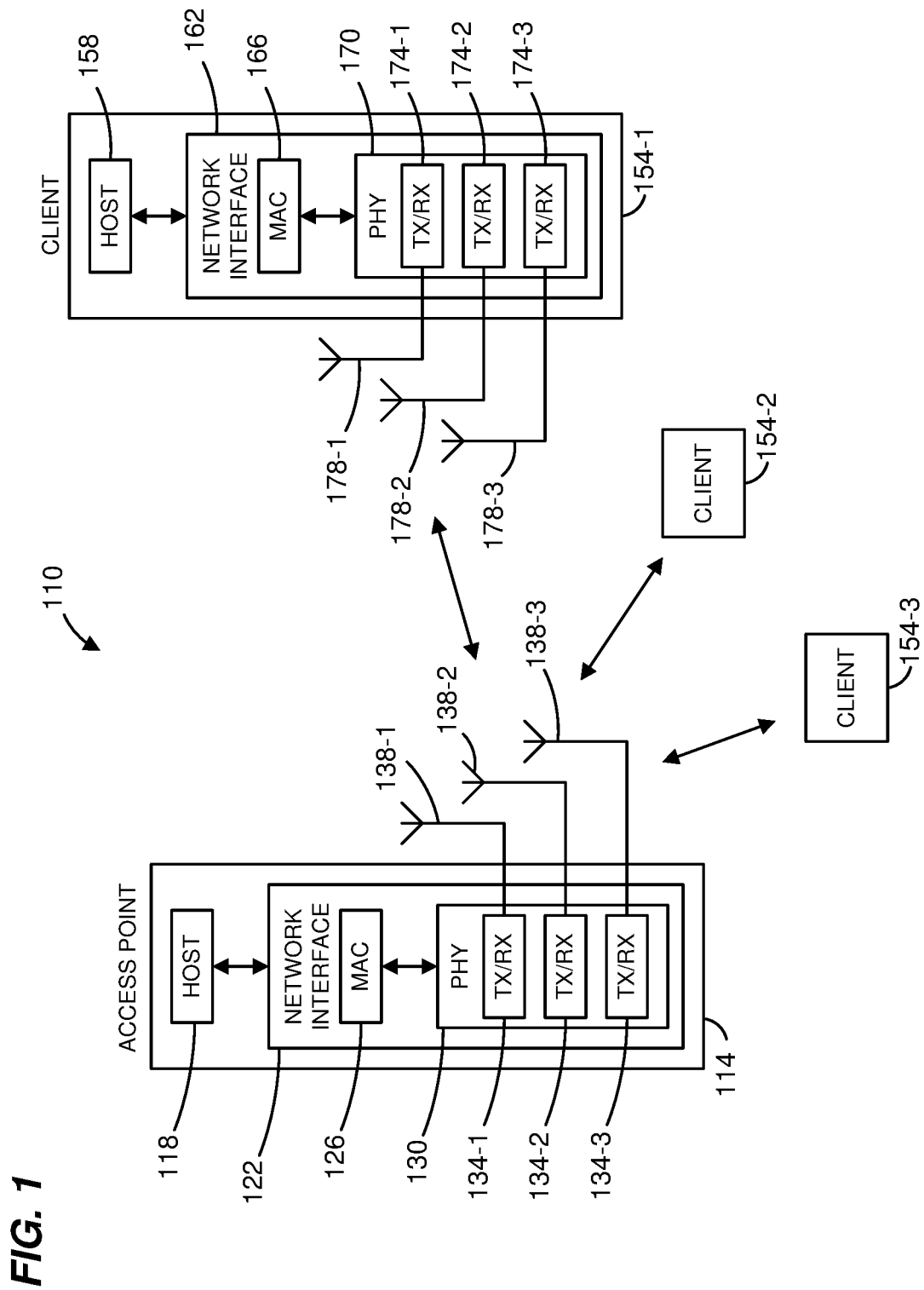
FIG. 1 is a block diagram of an example wireless local area network (WLAN), according to an embodiment.

Beamforming feedback techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, beamforming feedback techniques are utilized in other types of wireless communication systems such as personal area networks (PANs), mobile communication networks such as cellular networks, metropolitan area networks (MANs), etc.

In embodiments described below, a wireless network device such as an access point (AP) of a wireless local area network (WLAN) transmits data streams to one or more client stations. In some embodiments, the WLAN supports multiple input multiple output (MIMO) communication in which the AP and/or the client stations include more than one antenna, thereby creating a plurality of spatial (or space-time) streams over which data can be transmitted simultaneously. In an embodiment in which the AP employs multiple antennas for transmission, the AP utilizes various antennas to transmit the same signal while phasing (and amplifying) this signal as it is provided to the various transmit antennas to achieve beamforming or beamsteering. In order to implement a beamforming technique, the AP generally requires knowledge of certain characteristics of the communication channel between the AP and the one or more client stations for which a beamforming pattern is to be created. To obtain channel characteristics, according to an embodiment, the AP transmits to a client station a sounding packet including a number of training fields that allow the client station to accurately estimate the MIMO channel. The client station then transmits or feeds back, in some form, the obtained channel characteristics to the AP, for example by including channel characteristic information in a management or a control frame transmitted to the AP. Upon receiving, from one or more of the client stations, information characterizing the corresponding communication channels, the AP is generates desired beam patterns to be used in subsequent transmissions to one or more stations, in various embodiments.

In an embodiment, a client station determines a steering matrix based on channel characteristics obtained using training signals from the AP, and transmits compressed feedback to the AP, the compressed feedback including compressed information, such as angles that represent the steering matrix that may then be used to reconstruct the steering matrix by the AP. To efficiently generate the compressed feedback, in an embodiment, the client station generates the compressed feedback using a technique that does not include decomposing the steering matrix. For example, the client station decomposes a channel matrix, or an intermediate matrix derived from the channel matrix, to jointly determine a steering matrix and compressed feedback that represents the steering matrix, in an embodiment. Various techniques for determining compressed feedback based on a channel matrix and without decomposing a steering matrix allow the client station to determine compressed feedback that accurately represents the steering matrix quicker, with less hardware, less physical area, less power consumption, lower computational complexity, etc., compared to systems that first determine a steering matrix and then obtain compressed feedback by decomposing the steering matrix, in at least some embodiments.

FIG. 1 is a block diagram of an example WLAN 110, according to an embodiment. The WLAN 110 includes an access point (AP) 114 that comprises a host processor 118 coupled to a network interface device 122. The network interface device 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130.

The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 includes circuitry (e.g., in the transceivers 134) configured to upconvert baseband signals to radio frequency (RF) signals for wireless transmission via the antennas 138.

Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units. The PHY processor 130 includes circuitry (e.g., in the transceivers 134) configured to downconvert RF signals received via the antennas 138 to baseband signals.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol.

The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 includes circuitry (e.g., in the transceivers 174) configured to upconvert baseband signals to RF signals for wireless transmission via the antennas 178.

Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units. The PHY processor 170 includes circuitry (e.g., in the transceivers 174) configured to downconvert RF signals received via the antennas 178 to baseband signals.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the AP 114 is configured to implement beamforming for transmissions to one or more client stations 154 using knowledge of characteristics of the communication channels between the one or more client stations 154 and the AP 114. To obtain knowledge of characteristics of a communication channel between the AP 114 and a client station 154 (e.g., the client station 154-1), in an embodiment, the AP 114 transmits known training signals to the client stations 154-1. For example, in an embodiment, the AP 114 transmits a sounding packet to the client station 154-1, wherein the sounding packet includes one or more training fields (e.g., long training fields (LTF)) that include the training signals. The client station 154-1 receives the training signals from the AP 114 and develops a channel description of the communication channel based on the training signals received from the AP 114, in an embodiment. In mathematical terms, a signal received by the client station 154-1 from the AP 114 via the communication channel can be written as:

$$y_{N_r \times 1} = H_{N_r \times N_t} x_{N_t \times 1} + w_{N_r \times 1}$$ Equation 1 where y is the received signal vector, $N_r$ is the number of receive antennas; $N_t$ is the number of transmit antennas; H is a channel matrix corresponding to the communication channel; x is the transmitted signal vector; and w is additive noise vector. The client station 154-1 determines the channel matrix H based on received signal y and its knowledge of the transmitted training signal x, in an embodiment. In an embodiment in which OFDM communication is used, the client station 154-1 determines a plurality of channel matrices $H_i$, respective ones of the channel matrices $H_i$ corresponding to respective OFDM tones in the communication channel.

Based on the determined one or more channel matrices H, the client station 154-1 generates compressed beamforming feedback to be transmitted to the AP 114. The compressed beamforming feedback includes information (e.g., angles) that represents the one or more steering matrices determined based on the one or more channel matrices H, in an embodiment. In an embodiment, the client station 154-1 is configured to jointly determine, based on a channel matrix H, a steering matrix and compressed feedback that represents the steering matrix. For example, as explained in more detail below, the client station 154-1 is configured to implement a technique that determines compressed feedback in the process of determining a steering matrix, without first determining a steering matrix and then decomposing the steering matrix, in an embodiment.

According to an embodiment, the client station 154-1 is configured to determine compressed feedback by performing QR decomposition of a symmetric intermediate matrix derived from the channel matrix. Generally, QR decomposition of a symmetric matrix results in an orthogonal matrix Q and an upper triangular matrix R, where the orthogonal matrix Q is a sufficiently good approximation of singular vectors (e.g., eigenvectors) of the symmetric matrix. Accordingly, in an embodiment, QR decomposition of a symmetric intermediate matrix derived from the channel matrix generates an orthogonal matrix Q that is a sufficiently good approximation of a steering matrix with singular values of the channel matrix, such as, for example, a right singular vector matrix V that would be obtained from SVD decomposition of the channel matrix, in an embodiment. In some embodiments, the client station 154-1 is configured to perform multiple iterations of QR decomposition to obtain a Q matrix that is a better approximation of the steering matrix. Each iteration of QR decomposition is performed on a matrix that is a product of the intermediate matrix derived from the channel matrix and the matrix Q determined in the previous iteration of QR decomposition, in an embodiment. Several iterations of QR decomposition performed in this manner converge to a right singular vector matrix V that would be obtained from SVD decomposition of the channel matrix, in at least some embodiments.

In some embodiments, the client station 154-1 is configured to perform one or both of i) sorting columns of matrices operated on during each stage of QR decomposition such that dominant vectors are determined in each stage of QR decomposition and ii) dynamically scaling elements of matrices operated on during each stage of QR decomposition to prevent overflow and improve precision of computation using fixed point arithmetic operations. Such various techniques for determining compressed feedback based on a channel matrix and without decomposing a steering matrix, and employing one or both of i) sorting columns of matrices operated on during each stage of computation and ii) dynamically scaling elements of the matrices operated on during each stage of QR decomposition allow the client station to determine compressed feedback that accurately represents the steering matrix quicker, with less hardware, less physical area, less power consumption, lower computational complexity, etc., compared to systems that first determine a steering matrix and then obtain compressed feedback by decomposing the steering matrix, in at least some embodiments.

Figure 2:
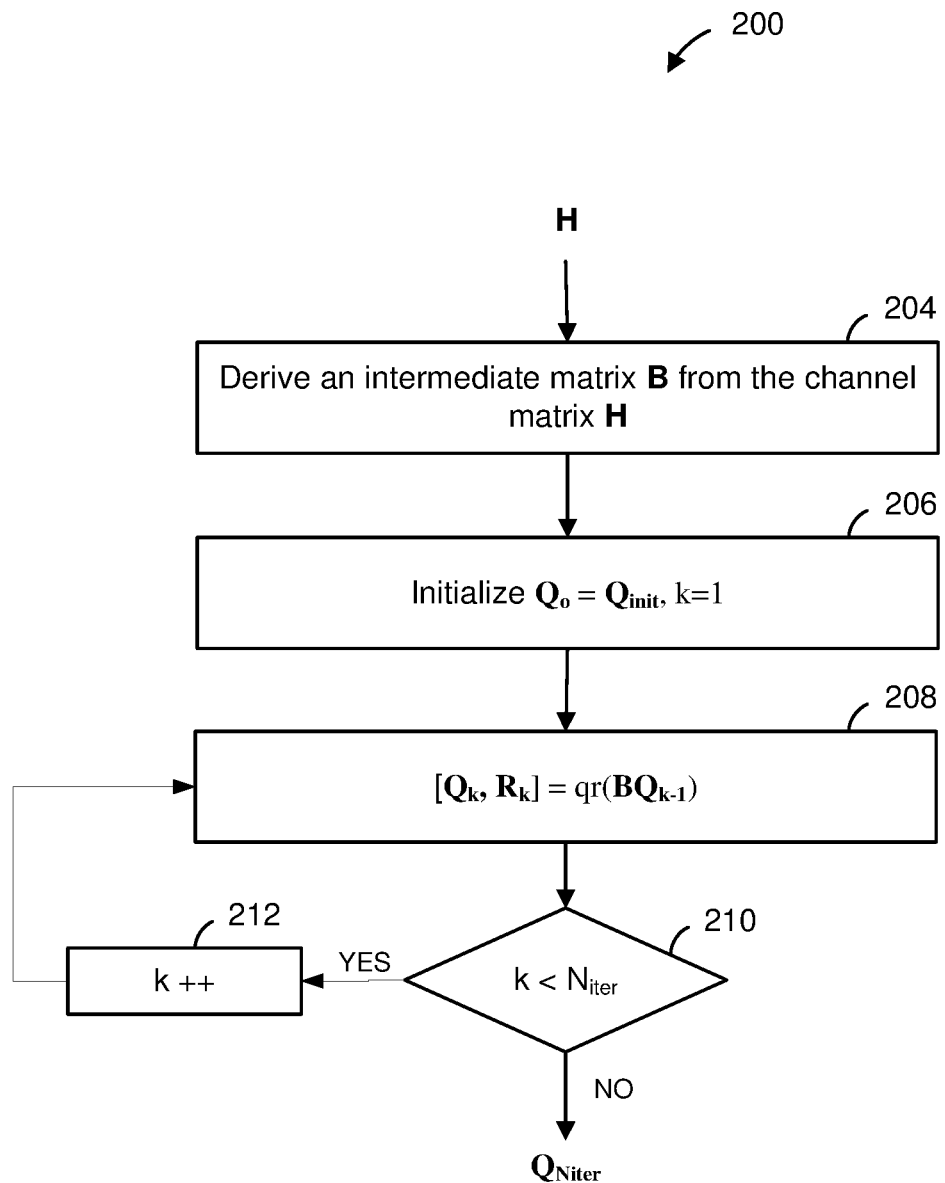
FIG. 2 is a flow diagram of a technique for jointly determining a steering matrix and compressed feedback that represents the steering matrix, according to an embodiment.

FIG. 2 is a flow chart of a technique 200 for jointly determining a steering matrix and compressed feedback that represents the steering matrix, according to an embodiment. In an embodiment, a client station (e.g., the client station 154-1 of FIG. 1) is configured to implement the technique 200 to determine compressed feedback to be fed back to the AP 114, and the technique 200 is discussed with reference to the client station 154-1 of FIG. 1 for explanatory purposes. In other embodiments, however, the technique 200 is implemented by an AP (e.g., the AP 114 of FIG. 1) or is implemented by another suitable communication device.

At block 204, an intermediate matrix B is derived from the channel matrix H. In an embodiment, the intermediate matrix B is a square symmetric matrix. For example, in an embodiment in which the channel matrix H has dimensions of $N_r \times N_t$, the determined intermediate matrix B has dimensions of $N_r \times N_r$. In an embodiment, the intermediate matrix B is determined by multiplying together the channel matrix H and a Hermitian transpose of the channel matrix H, according to $$B = H^H H \qquad \text{Equation 2}$$

where the Hermitian operator $^H$ stands for conjugate transpose. In another embodiment, the intermediate matrix B is determined by performing an initial QR decomposition of the channel matrix H to generate an orthogonal matrix $Q_1$ and an upper triangular matrix $R_1$ (i.e., $[Q_1, R_1]=qr(H)$), and determining the intermediate matrix according to $B=R_1^H$. In this embodiment, determination of the intermediate matrix B avoids performing matrix multiplication. Accordingly, in this embodiment, less hardware is needed for determining the intermediate matrix B. In other embodiments, the intermediate matrix B is determined based on the channel matrix H in other suitable manners.

At block 206, several initializations are performed. In an embodiment, block 206 includes initializing a matrix $Q_o$ to be equal to an initial matrix $Q_{init}$, where the initial matrix $Q_{init}$ is a suitable (e.g., random) orthonormal matrix, in an embodiment. In an embodiment, the initial matrix $Q_{init}$ has dimensions that correspond to the dimensions of the intermediate matrix B. For example, the initial matrix $Q_{init}$ has dimensions of $N_r \times N_r$, in an embodiment. Block 206 additionally includes initializing an integer counter k to be equal to 1, in an embodiment.

Blocks 208-212 perform iterative QR decomposition. At block 208, in the first iteration, QR decomposition of a matrix product of the intermediate B determined at block 204 and the matrix $Q_o$ initialized at block 206 is performed. At block 210, it is checked whether a number of iterations $N_{iter}$ has been reached. If it is determined that the number of iterations $N_{iter}$ has not yet been reached ($k<N_{iter}$ is true), then the integer counter k is incremented at block 212, and the technique returns to block 208. In each subsequent iteration (iteration k) that follows the first iteration, QR decomposition at block 208 is performed on a matrix resulting from multiplication of the intermediate matrix B determined at block 204 and the matrix $Q_{k-1}$ determined in the previous iteration (iteration k−1), in an embodiment.

Once it is determined at block 210 that the number of iterations $N_{iter}$ has been reached ($k<N_{iter}$ is false), the technique 200 terminates, with the result being the matrix $Q_{Niter}$ determined in the last iteration. Generally, one or several iterations of the technique 200 are sufficient to generate a matrix $Q_{Niter}$ that is a good approximation of a steering matrix V that would result, for example, from SVD decomposition of the channel matrix H, in at least some embodiments. As described in more detail below, performing one or several iterations of the technique 200, in addition to generating a steering matrix $Q_{Niter}$, also generates compressed feedback that represents the steering matrix $Q_{Niter}$, in an embodiment.

Referring still to FIG. 2, in an embodiment, perform QR decomposition at block 208 is performed using phase rotations and Givens rotations. Generally speaking, in an embodiment, QR decomposition to decompose a matrix $M_{n \times n}$ is performed in stages, wherein phase rotations n×n and Givens rotations are performed in every stage. In $k^{th}$ stage of QR decomposition, phase rotations are performed on the rows of the matrix M(k:n, k:n) so as to make elements of the first column of the matrix M(k:n, k:n) to be real and positive numbers. Phase rotation operations can be represented, in an embodiment, as pre-multiplication with matrices having the general form $$P_k = \begin{bmatrix} I_{k-1} & 0 & \cdots & 0 \\ 0 & e^{-j\varphi_{kk}} & 0 & \vdots \\ \vdots & 0 & \ddots & 0 \\ 0 & \cdots & 0 & e^{-j\varphi_{N_r k}} \end{bmatrix}$$

Then, Givens rotations are performed on the resulting (phase-rotated) matrix M(k:n, k:n) to zero-out the elements M(k+1:n,1). Givens rotation operations can be represented, in an embodiment, as pre-multiplications with matrices having the general form $$G_{ik} = \begin{bmatrix} I_{k-1} & 0 & \cdots & \cdots & 0 \\ 0 & \cos(\psi_{ik}) & 0 & \sin(\psi_{ik}) & \vdots \\ \vdots & 0 & I_{i-k-1} & 0 & \vdots \\ \vdots & -\sin(\psi_{ik}) & 0 & \cos(\psi_{ik}) & 0 \\ 0 & \cdots & \cdots & 0 & I_{N_r-i} \end{bmatrix} \text{ where } i > k$$

The phase rotations and the Givens rotations generate sets of angles $\varphi_{ik}$, ($1 \le k \le n$, $k \le i \le n$) and $\psi_{ik}$ ($1 \le k < n$, $k < i \le n$), respectively. Generally speaking, the sets of angles $\varphi_{ik}$ and angles $\psi_{ik}$ comprise compressed beamforming feedback. As will be explained in more detail below, in an embodiment, the client station 154-1 is configured to further process the set of angles $\varphi_{ik}$, generated by the phase rotations, to calculate a new set of angles $\phi_{ik}=(\varphi_{ik}-\varphi_{nk})$ where $k \le i < n$. In this embodiment, i) the new set of angles $\varphi_{ik}$ and ii) the set of angles $\psi_{ik}$ utilized for the Givens rotation operations comprise the compressed feedback angles. The client station 154-1 is configured to quantize the new set of angles $\varphi_{ik}$ and the set of angles $\psi_{ik}$ and to feed back the quantized angles to the AP 114, in this embodiment.

Figure 3A:
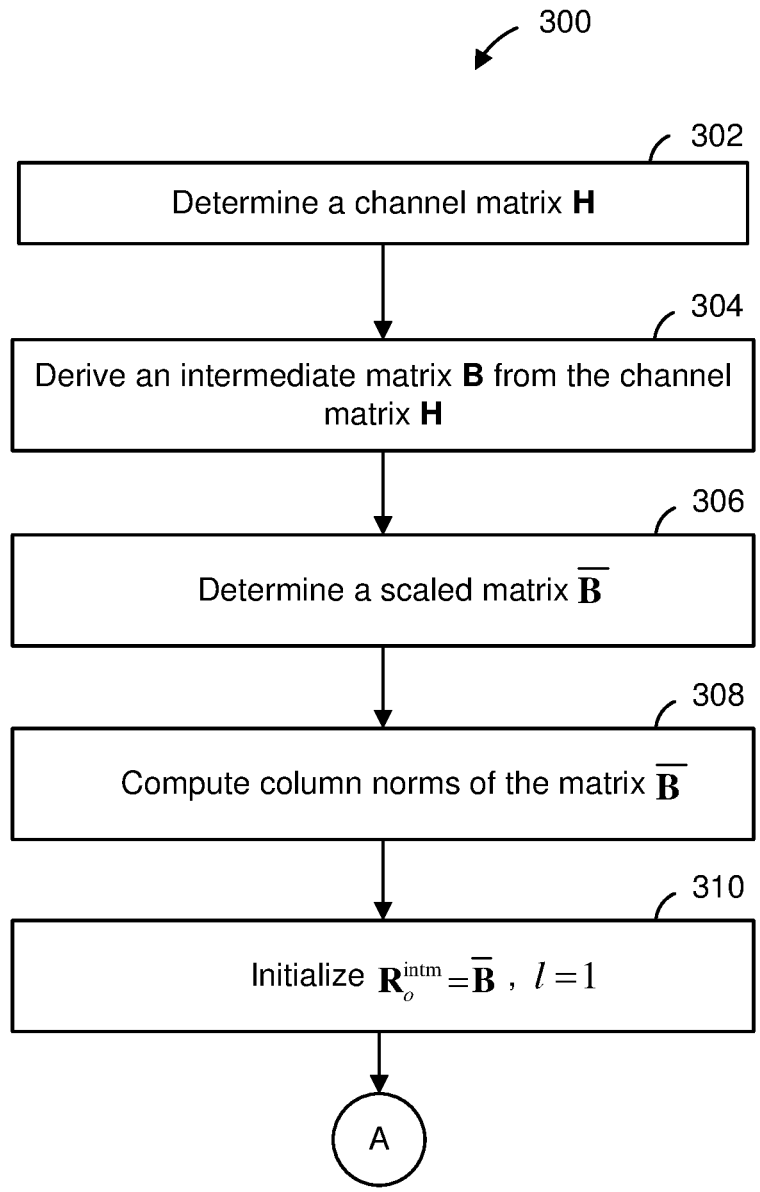
FIGS. 3A-3B are a flow diagram of a technique for jointly determining a steering matrix and compressed feedback that represents the steering matrix using one iteration of QR decomposition, according to an embodiment.
Figure 3B:
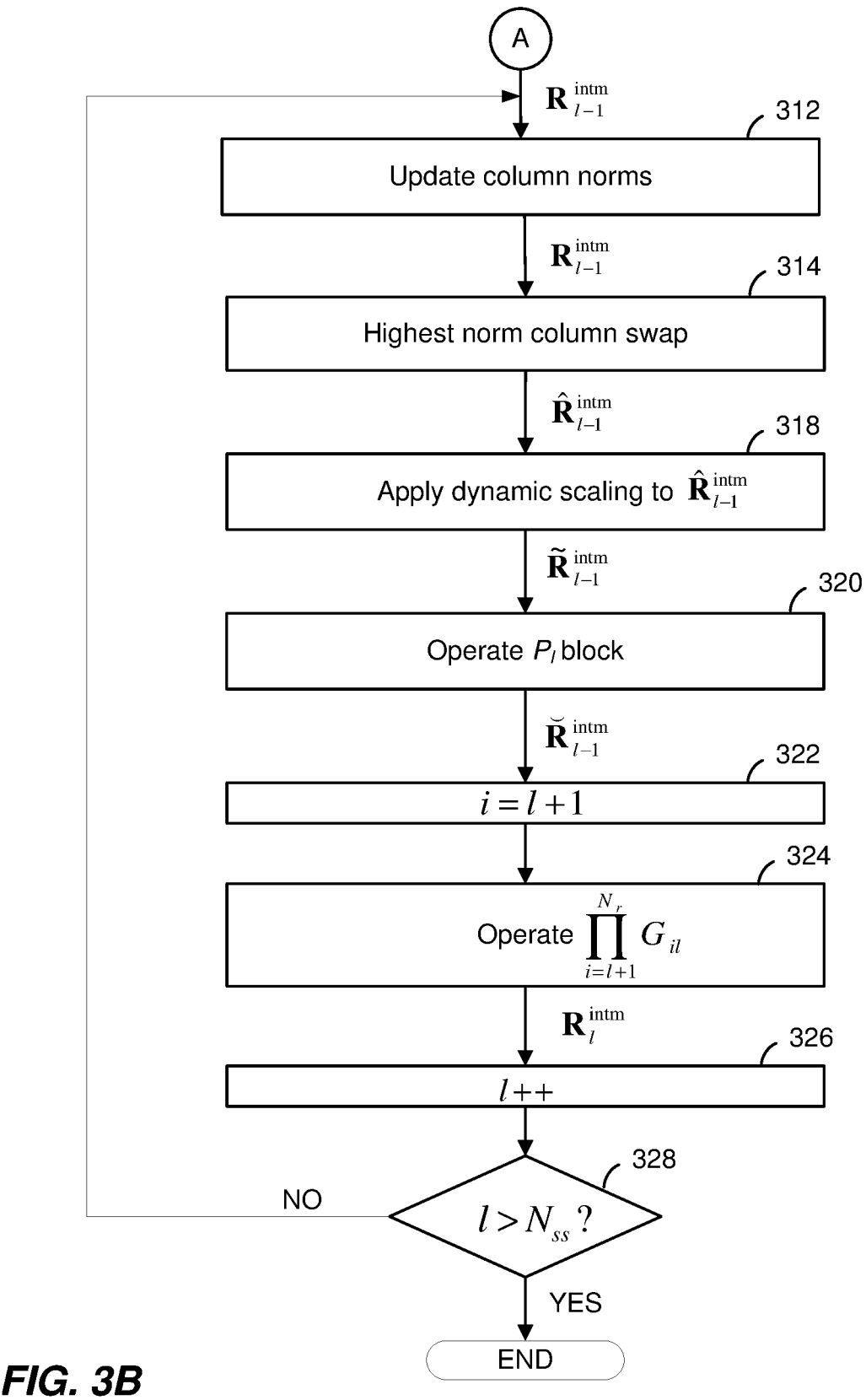

FIGS. 3A-3B are a flow diagram of a technique 300 for jointly determining a steering matrix and compressed feedback that represents the steering matrix, using one iteration of QR decomposition, according to an embodiment. In an embodiment, a client station (e.g., the client station 154-1 of FIG. 1) is configured to implement the technique 300 to determine compressed feedback to be fed back to the AP 114, and the technique 300 is discussed with reference to the client station 154-1 of FIG. 1 for explanatory purposes. In other embodiments, however, the technique 300 is implemented by an AP (e.g., the AP 114 of FIG. 1) or is implemented by another suitable communication device.

At block 302, the client station 154-1 determines a channel matrix H. In an embodiment, the client station 154-1 determines the channel matrix H based on a plurality of training signals received from the AP 114. The training signals are included in a data unit, such as a sounding data unit, that the client station 154-1 receives from the AP 114, in an embodiment. For example, the training signals are included in training fields (e.g., long training fields (LTF)) of a preamble of a data unit, such as a sounding data unit, that the client station 154-1 receives from the AP 114, in an embodiment. In other embodiments, the client station 154-1 determines the channel matrix H in other suitable manners.

At block 304, the client station 154-1 derives an intermediate matrix B from the channel matrix H determined at block 302. In an embodiment, the intermediate matrix B is a square symmetric matrix. In an embodiment, the client station 154-1 derives the intermediate matrix B from the channel matrix H as described above with respect to block 204 of FIG. 2. For example, in an embodiment, the client station 154-1 derives the intermediate matrix B by determining a product of the channel matrix H and a Hermitian transpose of the channel matrix H, according to $B=H^H H$ (Equation 2), where the Hermitian operator $^H$ stands for conjugate transpose. In another embodiment, the client station 154-1 derives the intermediate matrix B by decomposition the channel matrix H using QR decomposition to generate an orthogonal matrix $Q_1$ and an upper triangular matrix $R_1$, where $[Q_1, R_1]=qr(H)$, and setting the intermediate matrix $B=R_1^H$, where the Hermitian operator $^H$ stands for conjugate transpose. In this embodiment, the client station 154-1 derives the intermediate matrix B without performing matrix multiplication. Accordingly, in this embodiment, less hardware is needed for determining the intermediate matrix B. For example, in an embodiment, a QR decomposition block, such as a CORDIC block, that is used for determining the intermediate matrix B is also used in further QR processing performed to generate compressed feedback based on the intermediate matrix B. On the other hand, in an embodiment in which the intermediate matrix B is determined according to Equation 2 using matrix multiplication, a better approximation of a steering matrix is obtained, in some embodiments. In some embodiments, the intermediate matrix B is determined based on the channel matrix H in other suitable manners.

At block 306, the client station 154-1 dynamically scales the intermediate matrix B to generate a scaled matrix $\overline{B}$. In an embodiment, dynamically scaling the intermediate matrix B involves scaling each element of the matrix B by a scalar factor corresponding the "largest" element of the matrix B, or the highest-magnitude element of the matrix B. In an embodiment, the client station 154-1 identifies the element of the matrix B with the largest magnitude by analyzing magnitudes of elements on the diagonal of the matrix B. In this embodiment, the client station 154-1 identifies the largest element $B_{jj}$ on the diagonal of the matrix B that satisfies $$j=\arg\max B_{ii} \qquad \text{Equation 3}$$

where arg max denotes the arguments of the maxima operator. The client station 154-1 then determines a scaling factor for scaling the identified element $B_{jj}$ of the matrix B such that the leading bit of a number of bits used to store the element $B_{jj}$ is a logic one (1). In other words, in an embodiment, the scaling factor is determined such that scaling the element $B_{jj}$ by the determined scaling factor scales the magnitude of the element $B_{jj}$ such that $$1 \leq \overline{B}_{jj} < 2 \qquad \text{Equation 4}$$

In another embodiment, the scaling factor is determined based on the column with a highest norm value (e.g., L2-norm or L2-norm squared). In any event, upon determining the scaling factor, the client station 154-1 scales all elements of the matrix B by the determined scaling factor to generate the scaled matrix $\overline{B}$, in an embodiment. Scaling the matrix B such that the leading bit of the magnitude of the element $B_{jj}$ is a logic one (1) prevents overflow and improves precision in subsequent processing of the scaled matrix $\overline{B}$ with fixed point arithmetic operations, in at least some embodiments. Accordingly, in at least some embodiments, more reliable compressed feedback (e.g., more reliable feedback angles) is determined with less hardware as compared to embodiments in which dynamic scaling is not utilized.

At block 308, the client station 154-1 determines respective vector norm values (e.g., L2-norm values or L2-norm squared values) $c_3$ of the columns of the scaled matrix $\overline{B}$. In an embodiment, for each column j of $\overline{B}_{N_r \times N_r}$, the client station 154-1 computes an L2-norm squared$_c$ value (sometimes referred to herein as "squared norm value") $c_{N_r \times 1}$ according to $$c_j = \sum_{i=1}^{N_t} [\text{Re}(b_{ij})\text{Re}(b_{ij}) + \text{Im}(b_{ij})\text{Im}(b_{ij})] \qquad \text{Equation 5}$$

The client station 154-1 stores, in a memory, the respective computed squared norm values $c_j$ for the columns of the matrix $\overline{B}_{N_r \times N_r}$, in an embodiment.

Referring now to FIG. 3B, at block 310, a matrix $R_0^{intm}$ is initialized to be equal to the scaled matrix $\overline{B}$, and an integer counter/is initialized to be equal to 1, in an embodiment. The client station 154-1 then iteratively performs operations at blocks 312-328 until a number of spatial streams in the channel matrix H is reached, in an embodiment. Generally speaking, in the first stage of QR decomposition (1=1), operations at blocks 312-328 are performed on the matrix $\overline{B}$. In each subsequent stage of QR decomposition, operations at blocks 312-328 are performed on a sub-matrix of the matrix generated when the previous stage is completed. As just an example, in an embodiment with four spatial streams ($N_{SS}=4$), in the first stage, the matrix $\overline{B}$ (1:4, 1:4) is operated on. Continuing with the same example, in the second stage, a sub-matrix C(2:4, 2:4) is operated on, wherein C is the resulting matrix of the first stage, in an embodiment. Similarly, in the third stage, a sub-matrix D(3:4, 3:4) is operated on, wherein D is the resulting matrix of the second stage, in an embodiment.

Referring still to FIG. 3B, at block 312, the client station 154-1 determines new squared norm values, or updates the squared norm values determined at block 308, in various embodiments. In an embodiment, block 312 is not performed (i.e., skipped) for the first stage of QR decomposition. Instead, squared norm values determined and stored at block 308 are used for the first stage, in an embodiment. For each of the subsequent stages that follow the first stage, new column squared norm values are determined at block 312 for columns of the sub-matrix being operated on in the corresponding stage, in an embodiment. For example, in an embodiment with four spatial streams ($N_{SS}=4$), in the first stage, block 312 is skipped and the column squared norm values of the matrix $\overline{B}$ determined at block 308 are used. Continuing with the same example, in the second stage, new squared norm values are determined for columns of a sub-matrix C(2:4, 2:4), wherein C is the resulting matrix of the first stage, in an embodiment. Similarly, in the third stage, new squared norm values are determined for columns of a sub-matrix D(3:4, 3:4), wherein D is the resulting matrix of the second stage, in an embodiment. In an embodiment, determining new column squared norm values at block 312 comprises repeating operations of block 308 for the sub-matrix for which the new squared norm values are being determined. In another embodiment, determining new squared norm values at block 312 comprises updating the squared norm values determined for the corresponding columns in the previous stage. For example, in an embodiment, squared norm values are updated at block 312 according to $$c_{j_{new}} = c_{j_{prev}} m_{l-1}^2 ((Re(\hat{B}_{l-1,j}))^2 + (Im(\hat{B}_{l-1,j}))^2), l \leq j \leq N_t \quad \text{Equation 6}$$

where $c_{j_{new}}$ is the new column squared norm value being determined, $c_{j_{prev}}$ is the corresponding column squared norm from the previous stage l−1, $\hat{B}$ is the intermediate sub-matrix of the matrix $\overline{B}$ being operated on at the current stage l, and $m_{l-1}$ is the scaling factor applied at the stage l−1. In an embodiment, the updated squared norm values correspond to the remaining $N_r$−l+1 vectors in the orthogonal complement space of the first l−1 steering vectors. Updating the column squared norm values at block 312 rather than directly calculating new squared norm values at block 312 is more efficient and less computationally intensive, in at least some embodiments.

At block 314, a sorted matrix $\hat{R}_{l-1}^{intm}$ is determined by sorting the columns of the matrix $R_{l-1}^{intm}(1:N_r,1:N_t)$ such that the column with the highest squared norm value is the first column being operated on in the current stage of QR decomposition. Sorting the columns such that the column with the highest squared norm value is the first column being operated on in the current stage of QR decomposition ensures that the dominant steering vector of the remaining steering vectors is being determined in each stage of QR decomposition, thereby improving approximation of the steering matrix Q determined as a result of QR decomposition, in at least some embodiments. In an embodiment, the matrix $\hat{R}_{l-1}^{intm}$ is determined by identifying a column of the matrix $R_{l-1}^{intm}(1:N_r,1:N_t)$ with a highest squared norm value, and swapping the column with the highest squared norm value with the first column of the matrix $R_{l-1}^{intm}(1:N_r,1:N_t)$. In an embodiment, block 314 includes, in a stage l, determining the index j of the column of the matrix (or sub-matrix) $R_{l-1}^{intm}(1:N_r,1:N_t)$ with the highest squared norm value based on the stored squared norm values $c_j$ according to $$\tilde{j} = \underset{j=l}{\overset{N_t}{\operatorname{argmax}}}\, c_j \quad \text{Equation 7}$$

and swapping the $\tilde{j}^{th}$ column of the matrix $R_{l-1}^{intm}(1:N_r,1:N_t)$ with the first column of the matrix $R_{l-1}^{intm}(1:N_r,1:N_t)$. Block 314 additionally includes swapping the squared norm value $c_l$ of the first column of the matrix $R_{l-1}^{intm}(1:N_r,1:N_t)$ with the squared norm value $c_{\tilde{j}}$ corresponding to the $\tilde{j}^{th}$ column of the matrix $R_{l-1}^{intm}(1:N_r,1:N_t)$, in an embodiment.

At block 318, dynamic scaling of elements of the matrix $\hat{R}_{l-1}^{intm}$ is performed to generate a matrix $\tilde{R}_{l-1}^{intm}$. In an embodiment, block 318 is not performed (i.e., skipped) for the first stage of QR decomposition. Instead, scaling that is performed 306 is relied upon in the first stage. For each of the subsequent stages i, each element of the sub-matrix $\hat{R}_{l-1}^{intm}(1:N_r,1:N_t)$ is scaled, as described above with respect to block 318, based on the column with the maximum squared norm value among the columns of the sub-matrix $\hat{R}_{l-1}^{intm}(1:N_r,1:N_t)$, in an embodiment. In an embodiment, the elements of the sub-matrix $\hat{R}_{l-1}^{intm}(1:N_r,1:N_t)$ are scaled such that a suitable number of leading bits (e.g., one leading bit, two leading bits, etc.) of the absolute value of the largest value among the real and imaginary parts of the elements of the sub-matrix $\hat{R}_{l-1}^{intm}(1:N_r,1:N_t)$ have the value of logic 1. In another embodiment, the elements of the sub-matrix $\hat{R}_{l-1}^{intm}(1:N_r,1:N_t)$ are scaled such that a suitable number leading bits (e.g., one leading bit, two leading bits, etc.) of the largest squared norm value among squared norm values of the columns of the sub-matrix $\hat{R}_{l-1}^{intm}(1:N_r,1:N_t)$ have the value of logic 1. In yet another embodiment, the elements of the sub-matrix $\hat{R}_{l-1}^{intm}(1:N_r,1:N_t)$ are scaled such that a suitable number of leading bits (e.g., one leading bit, two leading bits, etc.) of the largest norm among norms of the columns of the sub-matrix $\hat{R}_{l-1}^{intm}(1:N_r,1:N_t)$ have the value of logic 1.

Figure 4:
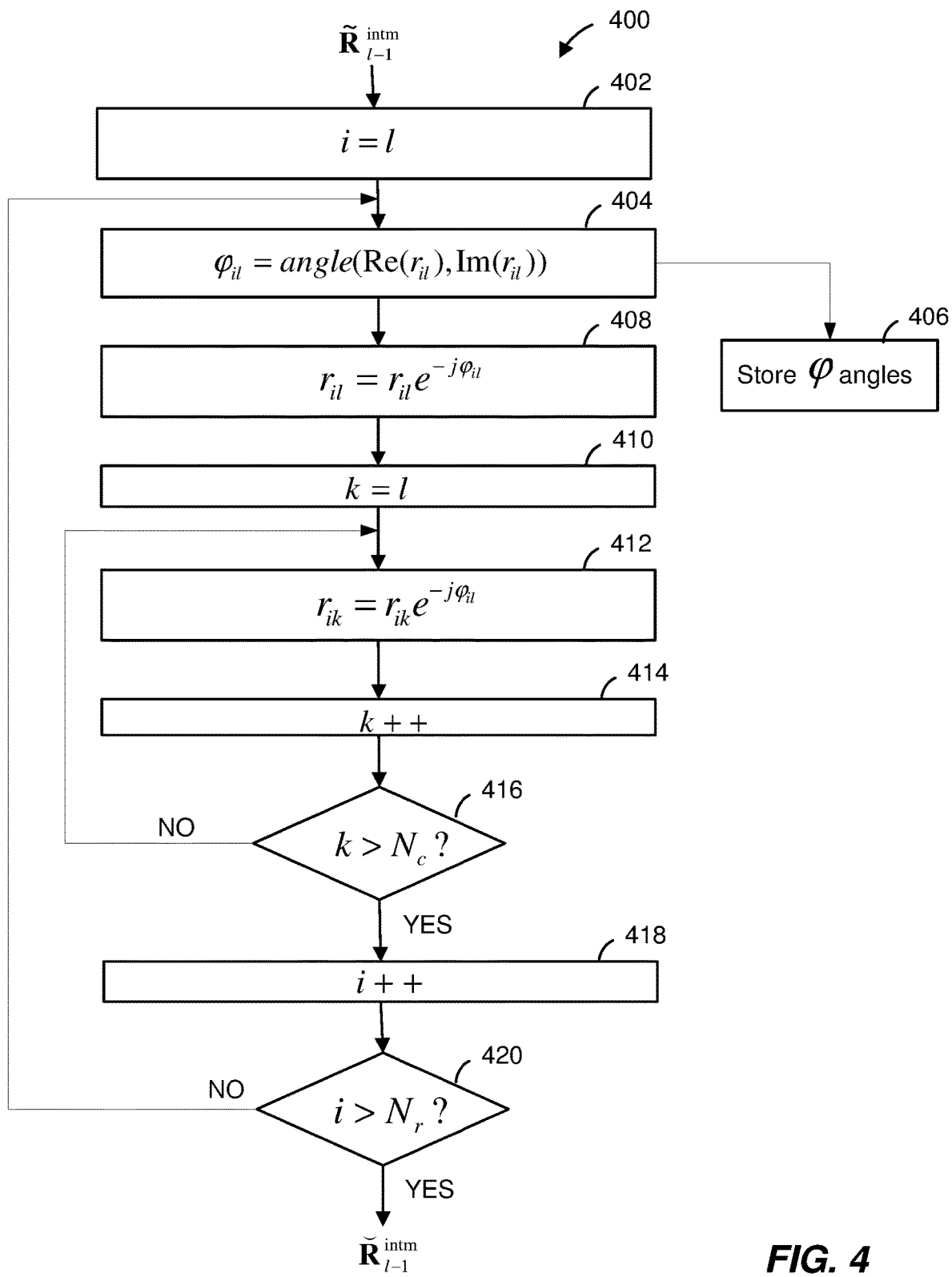
FIG. 4 is a flow diagram illustrating phase rotation operations performed with the technique of FIGS. 3A-3B, according to an embodiment.

At block 320, phase rotations on elements of the matrix $\tilde{R}_{l-1}^{intm}$ are performed to make elements of the first column of the matrix $\tilde{R}_{l-1}^{intm}$ real, positive numbers. FIG. 4 is a flow chart 400 illustrating phase rotation operations performed at block 320 of FIG. 3B, according to an embodiment. At block 402, an integer counter i is initialized to equal to the current value of the integer counter l. At block 404, the phase $\varphi_{il}$ of the element $r_{il}$ of the matrix is determined. At block 406, the phase $\varphi_{il}$ determined at block 404 is stored in a memory, for example in an array of phases $\varphi$ maintained in the memory. At block 408, the phase of the element $r_{il}$ is rotated by the value of the phase $\varphi_{il}$ determined at block 404 such that the element $r_{il}$ becomes a real, positive number. In an embodiment, the element $r_{il}$ is multiplied by $e^{-\varphi_{il}}$ to rotate the phase of the element $r_{il}$ such that the element $r_{il}$ becomes a real, positive number. At block 410, an integer counter k is initialized to be equal to the current value of the integer counter l. At blocks 412-416, phases of the remaining elements of the row of which the element $r_{il}$ is a part are iteratively rotated, until the number of columns of the matrix $\tilde{R}_{l-1}^{intm}$ has been reached (i.e., k>Nc at block 416, wherein Nc is the number of columns the matrix $\tilde{R}_{l-1}^{intm}$, is true). In an embodiment, phases of the remaining elements of the row of which the element $r_{il}$ is a part are iteratively rotated by the value of the phase $\varphi_{il}$ determined at block 404. For example, the remaining elements of the row of which the element $r_{il}$ is a part are multiplied by to rotate the phases of the remaining elements of the row by the value of the phase $\varphi_{il}$ determined at block 404, in an embodiment.

At block 418, the integer counter i is incremented. At block 420, it is determined whether the last row of the matrix $\tilde{R}_{l-1}^{intm}$ has been reached. If the last row has not been reached (i.e., if i≤$N_r$ at block 420, wherein $N_r$ is the number of rows in the matrix $\tilde{R}_{l-1}^{intm}$, is true), then the technique 400 returns to block 404, and the following iteration of the technique 400 is performed to rotate the elements of the matrix $\tilde{R}_{l-1}^{intm}$ to make the first element of the following row a real, positive number. On the other hand, if it is determined at block 420 that the last row has been reached (i.e., if i>$N_r$ is true), then determination of the matrix $\breve{R}_{l-1}^{intm}$ is completed, and the technique 400 terminates, in an embodiment. Example phase rotation operations in an example embodiment with four spatial streams are described below in connection with FIGS. 7A-7F.

Figure 5A:
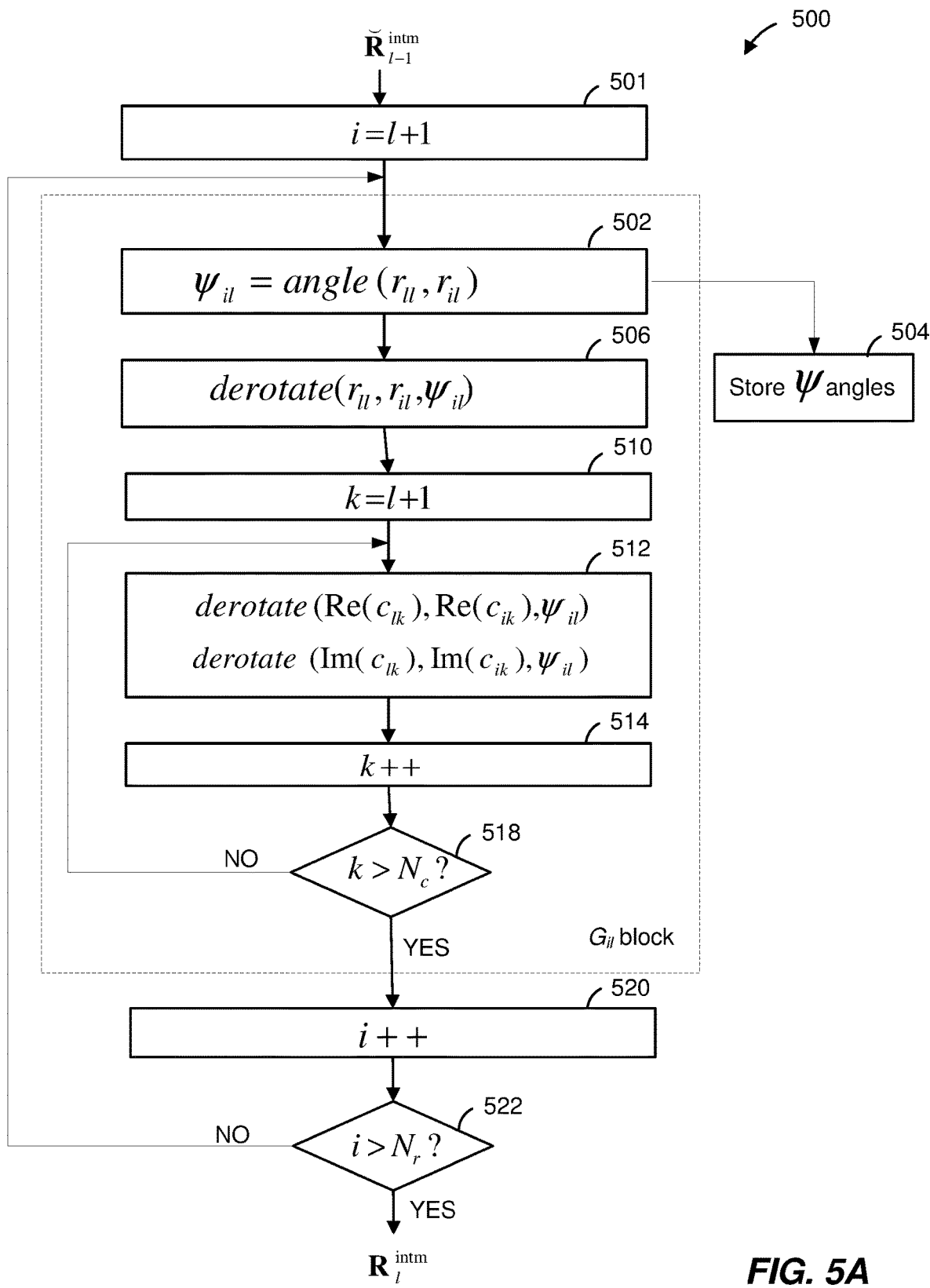
FIG. 5A is a flow diagram illustrating Givens rotation operations performed with the technique of FIGS. 3A-3B, according to an embodiment.
Figure 5B:
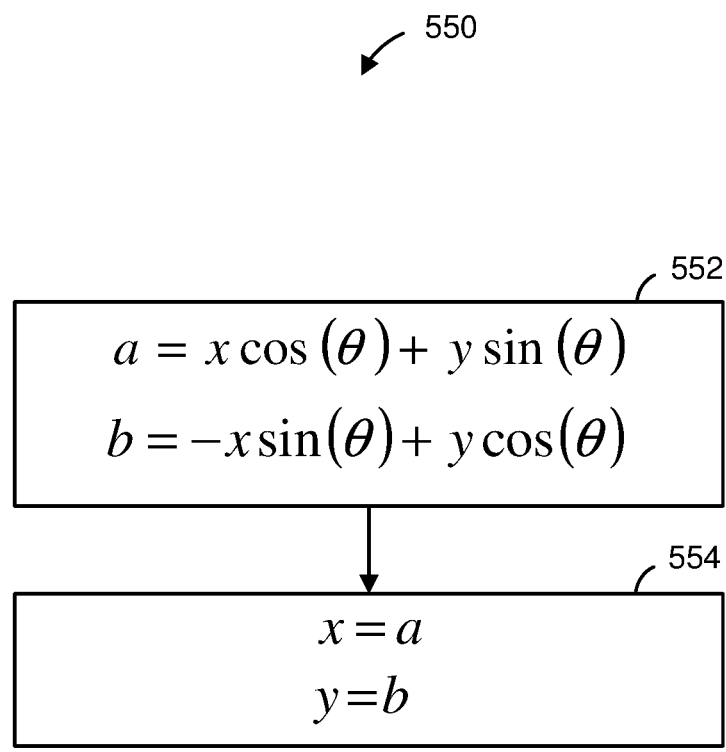
FIG. 5B is a flow diagram of a technique for a de-rotate operation performed with the Givens rotation operations of FIG. 5A, according to an embodiment.

Referring back to FIG. 3B, at block 322, the integer counter i in FIG. 3B is set to the value of l+1. At block 324, Givens rotation operations are performed on elements $r_{il}$ of the matrix $\breve{R}_{l-1}^{intm}$ for i being l+1 to $N_r$. The Givens rotations rotate the elements $r_{il}$ of the matrix $\breve{R}_{l-1}^{intm}$ to zero out the elements, in an embodiment. FIG. 5A is a flow chart 500 illustrating Givens rotation operations performed at block 324 for a particular value of i and for a particular stage l, according to an embodiment. During the particular stage l, the technique 500 is performed for each value of i from l+1 to $N_r$, and a product of the resulting matrices is determined to generate the matrix $R_l^{intm}$. Referring to FIG. 5A, at block 501, the value of i is set to equal to l+1. At block 502, the angle $\psi_{il}$ of $(r_{ll}+jr_{il})$ where $r_{ll}$ and $r_{il}$ are real parts of, respectively, elements of the matrix $\check{R}_{l-1}^{intm}$ indexed ll and il is determined. At block 504, the angle 104 $_{il}$ determined at block 502 is stored in a memory, for example in an array of phases $\psi$ maintained in the memory. At block 506, a de-rotate operation with inputs $r_{ll}$, $r_{il}$, $\psi_{il}$ is performed. Referring briefly to FIG. 5B, a general technique 550 for a de-rotate operation with inputs x, y, θ includes blocks 552 and 554. At block 552, values of variable a and b are computed according to $$a = x \cos(\theta) + y \sin(\theta) \qquad \text{Equation 8}$$

$$b = x \sin(\theta) + y \cos(\theta) \qquad \text{Equation 9}$$

At block 554, x and y are set to computed values of a and b, respectively, and the de-rotate operation is completed, in an embodiment.

Referring back to FIG. 5A, at block 510, an integer counter k is initialized to equal l+1. At block 512, two de-rotate operations are performed. In particular, a first de-rotation with inputs $\text{Re}(c_{lk}, \text{Re}(c_{ik}), \psi_{il}$, where $c_{lk}$ and $c_{ik}$ are complex elements of the matrix $\check{R}_{l-1}^{intm}$, indexed, respectively, lk and ik, is performed as described above with respect to FIG. 5B, in an embodiment. Additionally, a second de-rotation with inputs $\text{Im}(c_{lk})$, $\text{Im}(c_{ik})$, $\psi_{il}$, where $c_{lk}$ and $c_{ik}$ are complex elements of the matrix $\check{R}_{l-1}^{intm}$, indexed, respectively, lk and ik, is performed as described above with respect to FIG. 5B, in an embodiment.

At block 514, the integer counter k is incremented. At blocks 512-518, all elements in rows i and l and columns l+1 to $N_c$ of the matrix $\check{R}_{l-1}^{intm}$ are iteratively de-rotated in accordance with the de-rotation performed at block 506. At block 518, it is determined whether the last column of the matrix $\check{R}_{l-1}^{intm}$ has been reached. If it is determined at block 518 that the last column of the matrix $\check{R}_{l-1}^{intm}$ has not been reached (i.e., if k≤$N_c$ is true), then the technique 500 returns to block 512, and de-rotations of the next elements $c_{lk}$ and $c_{ik}$ in the row l and i, respectively, are performed. On the other hand, if it is determined at block 518 that the last column of the matrix $\check{R}_{l-1}^{intm}$ has been reached (i.e., if k>$N_c$ is true), then the operation of the block $G_{il}$ for the current iteration i is completed, in an embodiment.

Referring still to FIG. 5A, at block 520, the integer counter i is incremented. At block 522, it is determined whether the last row of the matrix $\check{R}_{l-1}^{intm}$ has been reached. If it is determined at block 520 that the last row of the matrix $\check{R}_{l-1}^{intm}$ has not been reached (i.e., if i≤$N_r$ is true), then the technique 500 returns to block 502, and another iteration i of the $G_{il}$ block is performed. On the other hand, if it is determined at block 520 that the last row of the matrix $\check{R}_{l-1}^{intm}$ has been reached (i.e., if i>$N_r$ is true), then the technique 500 terminates, in an embodiment.

Example Givens rotation operations in an example embodiment with four spatial streams are described below in connection with FIGS. 7A-7F.

Referring back to FIG. 3B, at block 326, the integer counter l is incremented. At block 328, it is determined whether the last spatial stream has been reached. If it is determined at block 328 that the last spatial stream has not been reached (i.e., if l≤$N_{ss}$ is true), then the technique 300 returns to block 312, and another stage of QR decomposition (blocks 312-328) is performed. On the other hand, if it is determined at block 328 that the last spatial stream has been reached (i.e., if l>$N_{ss}$ is true), then the QR decomposition of the matrix $\overline{B}$ is completed, and the technique 300 terminates, in an embodiment.

In an embodiment, the angles φ and ψ saved, respectively, at block 406 and 504 generally correspond to feedback angles $\varphi_{ij}$ and $\psi_{ij}$ to be fed back to the AP 114. In an embodiment, the client station 154-1 is configured to further process the angles φ to determine a new set of feedback angles $\phi_{ij}$. For example, the client station 154-1 determines the new set of angles $\phi_{ij}$, by subtracting the angle $\varphi_{nj}$ determined in the last row of the stage j from each angle $\varphi_{ij}$ determined in each of the other rows in stage j according to $$\phi_{ij} = \varphi_{ij} - \varphi_{nj} \qquad \text{Equation 10}$$

where j≤i<n. The angles ψ saved at block 504, on the other hand, do not require further calculations, in an embodiment. The client station 154-1 is configured to quantize i) the new angles $\phi_{ij}$ determined based on the angles φ saved at block 406 and ii) the angles ψ saved at block 504, and to provide the quantized angles as feedback to the AP 114, in an embodiment.

Figure 6A:
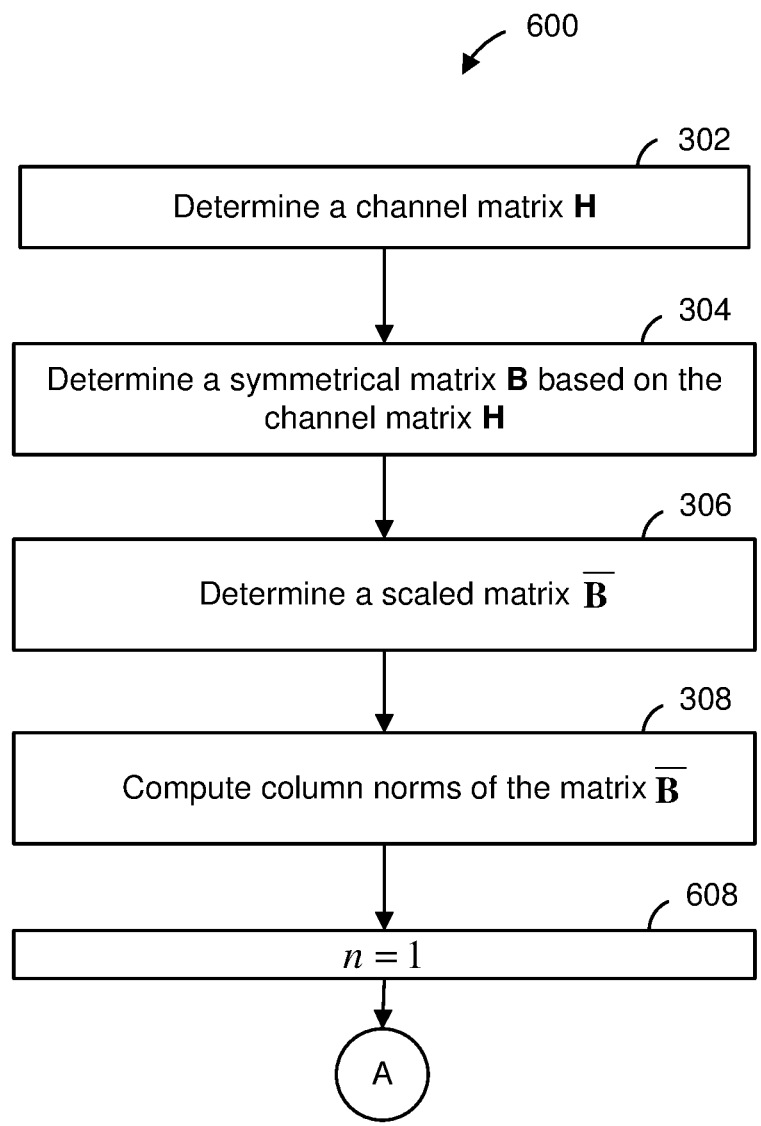
FIGS. 6A-6B are a flow diagram of a technique for jointly determining a steering matrix and compressed feedback that represents the steering matrix using multiple iterations of QR decomposition, according to an embodiment.
Figure 6B:
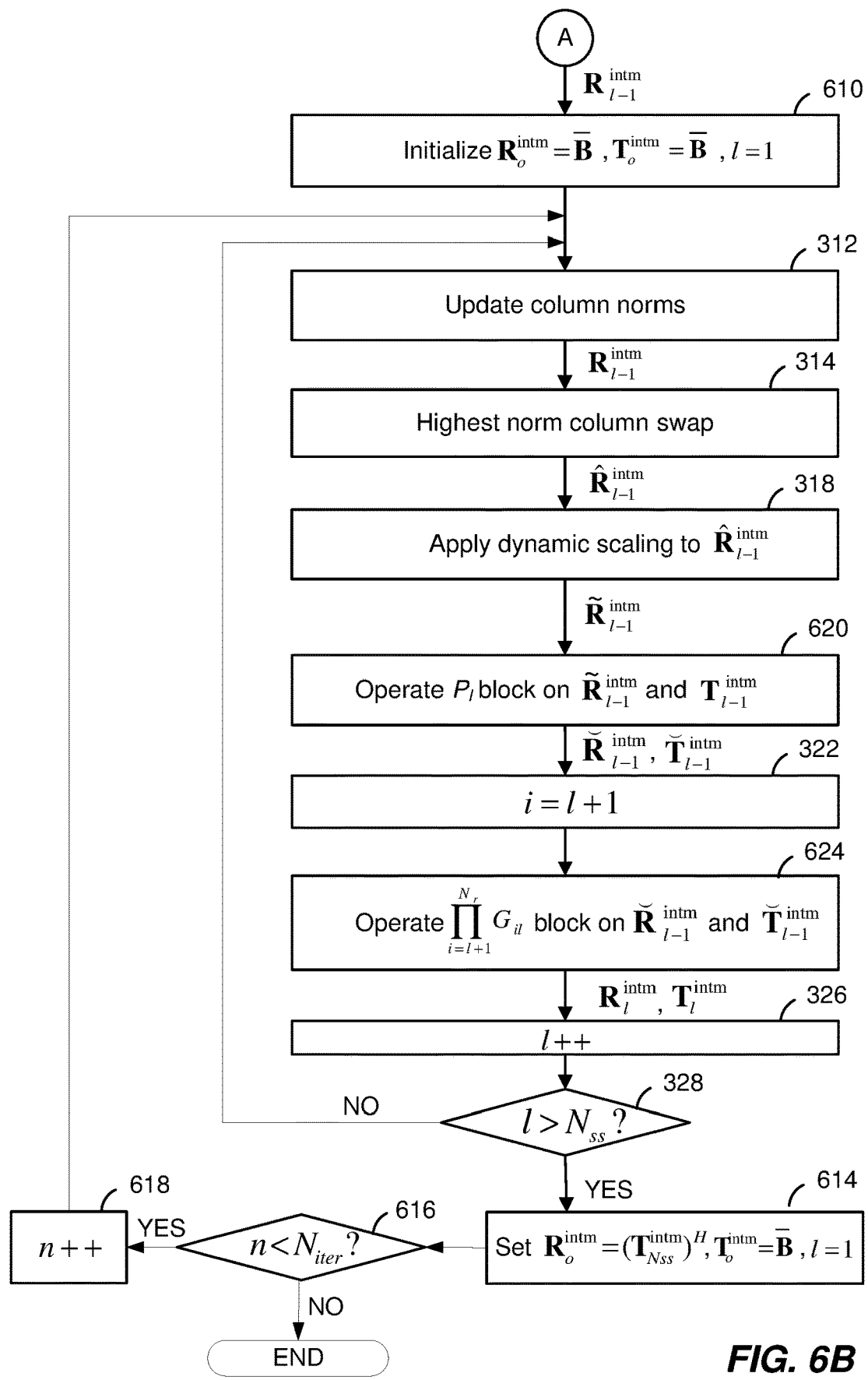

FIGS. 6A-6B are a flow diagram of a technique 600 for jointly determining a steering matrix and compressed feedback that represents the steering matrix, using multiple iterations of QR decomposition, according to an embodiment. In an embodiment, a client station (e.g., the client station 154-1 of FIG. 1) is configured to implement the technique 600 to determine compressed feedback to be fed back to the AP 114, and the technique 600 is discussed with reference to the client station 154-1 of FIG. 1 for explanatory purposes. In other embodiments, however, the method 600 is implemented by an AP (e.g., the AP 114 of FIG. 1) or is implemented by another suitable communication device.

The technique 600 is generally similar to the technique 300 of FIGS. 3A-3B, and includes many of the same-numbered blocks with the technique 300 of FIGS. 3A-3B which are not described again for conciseness. Unlike the technique 300 of FIGS. 3A-3B, however, the technique 600 includes performing multiple iterations of QR decomposition for jointly determining a steering matrix and compressed feedback that represents the steering matrix.

Referring to FIG. 6A, the technique 600 begins with the blocks 302-308 described above with respect to FIG. 3A, in an embodiment. The technique 600 continues with block 608, at which an integer counter n is initialized to be equal to 1. Referring now to FIG. 6B, at a block 610, several initiations are performed. A matrix $R_0^{intm}$ is initialized to be equal to the scaled matrix $\overline{B}$, in an embodiment. Similarly, a matrix $T_0^{intm}$ is initialized to be equal to the scaled matrix $\overline{B}$, in an embodiment. Additionally, an integer counter l is initialized to be equal to 1, in an embodiment. The technique 600 continues with iteratively performing blocks 312-318, 620, 322, 624 and 326 until a number of spatial streams N in the channel matrix H is reached, at which point the first iteration is completed. Blocks 620 and 624 are similar to the block 320 and 324, respectively, of FIG. 3B, except that block 620 and 624 apply the phase rotation operations P and the Givens rotation operations G, respectively, directly to the scaled matrix $\overline{B}$ to efficiently determine the product of the scaled matrix $\overline{B}$ and the matrix Q determined in the previous iteration, in an embodiment.

With continued reference to FIG. 6B, at block 614, the matrix $R_0^{intm}$ is set to be equal to the conjugate transpose of the matrix $T_{Nss}^{intm}$ the matrix $T_0^{intm}$ is set to be equal to the matrix $\overline{B}$, and the integer counter l is set to be equal to 1, in an embodiment. At block 616, it is determined whether a number of iterations $N_{iter}$ has been reach. If it is determined at block 616 that the number of iterations has not yet been reached (i.e., if $n<N_{iter}$ is true), then at block 618 the integer counter n is incremented, and the technique 600 returns to block 312 to begin another iteration n of blocks 312-318, 620, 322, 624, 326, 328, 614 and 616. On the other hand, if it is determined at block 616 that the last iteration has been reached (i.e., if $n≥N_{iter}$ is true), this signifies that determination of the steering vectors is completed, and the technique 600 terminates, in an embodiment. The client station 154-1 is configured to generate feedback to the AP 114 based on the phase rotation angles φ and the Givens rotation angles ψ determined in the last iteration n, in an embodiment.

FIGS. 7A-7F are diagrams illustrating various operations performed to jointly determine a steering matrix Q and feedback angles representing the steering matrix Q by decomposing a 4×4 matrix in an example embodiment in which a communication channel includes four spatial streams. In an embodiment, a client station (e.g., the client station 154-1 of FIG. 1) is configured to implement the operations illustrated in FIGS. 7A-7F in determining compressed feedback, for a channel with 4 spatial streams, to be fed back to the AP 114, and the FIGS. 7A-7F are discussed with reference to the client station 154-1 of FIG. 1 for explanatory purposes. In other embodiments, however, the operations illustrated in FIGS. 7A-7F are implemented by an AP (e.g., the AP 114 of FIG. 1) or is implemented by another suitable communication device.

Figure 7A:
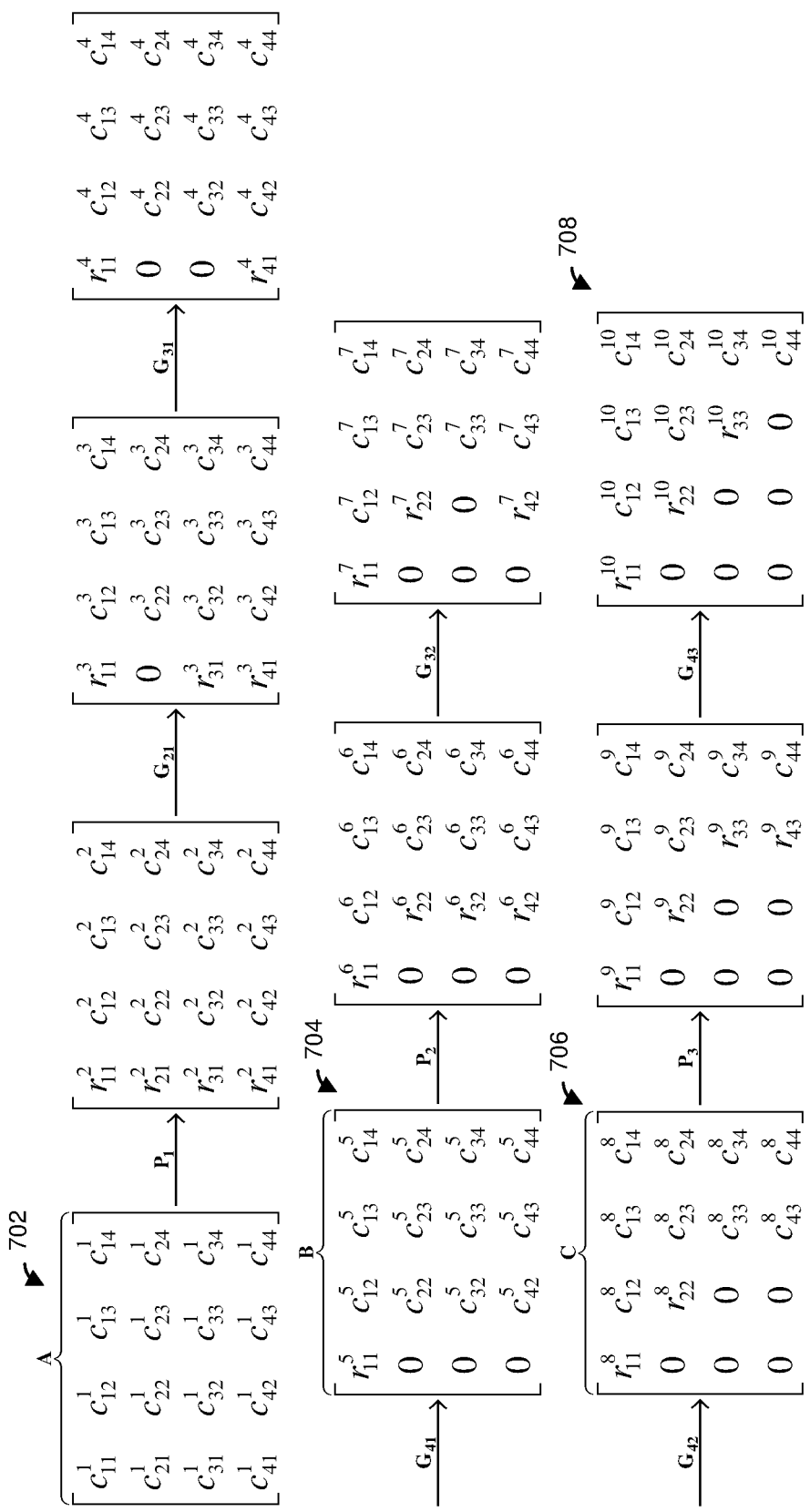

FIG. 7A is a diagram illustrating QR operations performed to decompose an example 4×4 matrix A to jointly determine, based on the matrix A, a steering matrix and compressed feedback that represents the steering matrix, in an embodiment in which a communication channel includes four spatial streams. In FIG. 7A, a variable c is used to represent a complex number of the matrix and a variable r is used to represent a real positive number. The superscripts in FIG. 7A generally indicate an element of the matrix A before and after a corresponding operation of QR decomposition is performed on the element, in an embodiment. Thus, for example, the element $c_{11}^1$ represents the element in the first column and the first row of the matrix A before the first phase rotation operation $P_1$ is performed, the element $r_{11}^2$ represents the element in the first column and the first row of the matrix A after the first phase rotation operation P1 is performed; the $r_{11}^3$ represents the element in the first column and the first row of the matrix A after the first Givens rotation operation $G_{21}$ is performed; and so on, in an embodiment.

As illustrated in FIG. 7A, QR decomposition of the 4×4 matrix A 702 is performed in three stages. In the first stage of QR decomposition, a first phase rotation operation $P_1$ rotates the elements in the first column of the matrix A[1:4,1:4] such that the elements become real, positive numbers. Then, Givens rotation operations $G_{21}$, $G_{31}$, and $G_{41}$ are sequentially performed to zero out the elements in the second, third, and fourth row, respectively, of the first column of the rotated matrix A. The first stage of QR decomposition results in the matrix B 704, in the illustrated embodiment. In the second stage of QR decomposition, a second phase rotation operation $P_2$ rotates the elements in the first column of the sub-matrix B[2:4,2:4] such that the elements become real positive numbers. Then, Givens rotation operations $G_{32}$ and $G_{42}$ are sequentially performed to zero out the elements in the second and third row, respectively, of the first column of the rotated sub-matrix B[2:4, 2:4]. The second stage of QR decomposition results in the matrix C 706, in the illustrated embodiment. In the third stage of QR decomposition, a third phase rotation operation $P_3$ rotates the elements in the first column of the sub-matrix C[3:4,3:4] such that the elements become real positive numbers. Then, a Givens rotation operation $G_{43}$ is performed to zero out the element in the second row of the first column of the rotated sub-matrix C[3:4,3:4]. The third stage of QR decomposition results in the matrix 708, in the illustrated embodiment.

The cumulative effects of the operations applied on the matrix 702 to obtain the matrix 708 in FIG. 7A can be written as a matrix multiplication $Q^H=G_{43}P_3G_{42}G_{32}P_2G_{41}G_{31}G_{21}P_1$, where $P_1$, $P_2$ and $P_3$ are matrices illustrated in FIG. 7B, and $G_{21}$, $G_{31}$, $G_{41}$, $G_{32}$, $G_{42}$, and $G_{43}$ are matrices illustrated in FIG. 7C. As shown in FIGS. 7B-7C, the operations in FIG. 7A use a set of angles $\{\varphi_{11}, \varphi_{21}, \varphi_{31}, \varphi_{41}, \varphi_{22}, \varphi_{32}, \varphi_{42}, \varphi_{33}, \varphi_{43}\}$ and a set of ψ angles $\{\psi_{21}, \psi_{31}, \psi_{41}, \psi_{32}, \psi_{42}, \psi_{43}\}$. The φ angles used in the phase rotation (P) operations in FIG. 7A are determined as illustrated in FIG. 7D, in an embodiment. The ψ angles used in the Givens rotation (G) operations in FIG. 7A are determined as illustrated in FIG. 7E, in an embodiment. The set of φ angles determined as illustrated in FIG. 7D are further processed to calculate a new set of φ angles as illustrated in FIG. 7F, in an embodiment. The new set of φ determined as illustrated in FIG. 7F and the set of ψ angles determined as illustrated in FIG. 7E comprise the feedback angles, in an embodiment. Accordingly, the new set of φ determined as illustrated in FIG. 7F and the set of ψ angles determined as illustrated in FIG. 7E are quantized and fed back to the AP 114, in an embodiment.

Figure 8:
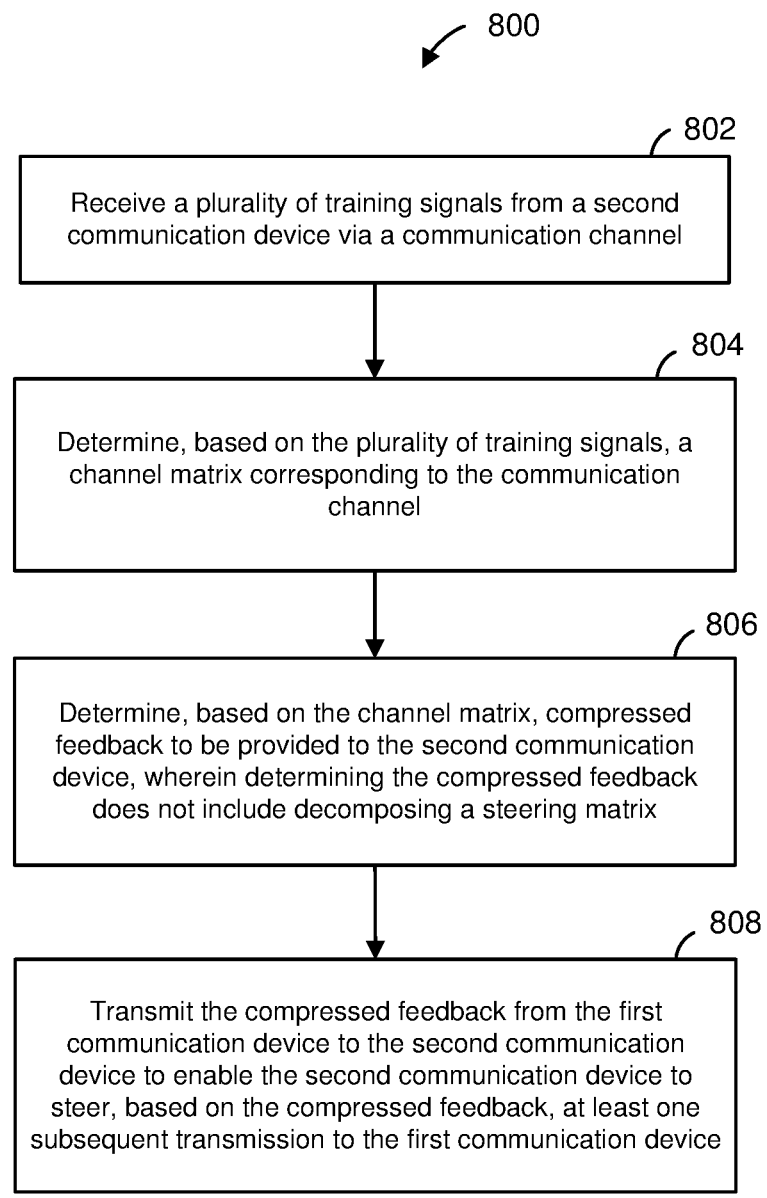
FIG. 8 is a flow diagram of an example method for providing beamforming feedback in a communication channel, according to an embodiment.

FIG. 8 is a flow diagram of an example method 800 for providing beamforming feedback in a communication channel, according to an embodiment. In an embodiment, the method 800 is implemented by a first communication device. With reference to FIG. 1, the method 800 is implemented by the network interface device 162, in an embodiment. For example, in one such embodiment, the PHY processor 170 is configured to implement the method 800. According to another embodiment, the MAC processor 166 is also configured to implement at least a part of the method 800. With continued reference to FIG. 1, in yet another embodiment, the method 800 is implemented by the network interface device 122 (e.g., the PHY processor 130 and/or the MAC processor 126). In other embodiments, the method 800 is implemented by other suitable network interface devices.

At block 802, a plurality of training signals are received from a second communication device. In an embodiment, a sounding packet is received, wherein the sounding packet includes the plurality of training signals. In an embodiment, the training signals are received in one or more LTF fields of a sounding packet. In other embodiments, the training signals are received in other suitable manners.

At block 804, a channel matrix corresponding to the communication channel is determined. In an embodiment, the channel matrix is determined based the training signals received at block 802.

At block 806, compressed feedback is determined based on the channel matrix determined at block 804. In an embodiment, determining the compressed feedback at block 806 does not include decomposing a steering matrix. In an embodiment, the compressed feedback is determined using the technique 200 of FIG. 2. In another embodiment, the compressed feedback is determined using the technique 300 of FIGS. 3A-3B. In yet another embodiment, the compressed feedback is determined using the technique 600 of FIGS. 6A-6B. In other embodiments, the compressed feedback is determined using other suitable techniques that do not include decomposing a steering matrix.

At block 808, the compressed feedback determined at block 806 is transmitted to the second communication device. In an embodiment, the compressed feedback is transmitted to the second communication device to enable the second communication device to steer, based on the compressed feedback, at least one subsequent transmission to the first communication device. Accordingly, the first communication device is configured to receive at least one subsequent transmission, steered based on the compressed feedback, from the second communication device, in an embodiment.

In an embodiment, a method for providing beamforming feedback in a communication channel includes: receiving, at a first communication device, a plurality of training signals from a second communication device via the communication channel; determining, at the first communication device based on the plurality of training signals, a channel matrix corresponding to the communication channel; determining, at the first communication device based on the channel matrix, compressed feedback to be provided to the second communication device, wherein determining the compressed feedback does not include decomposing a steering matrix; and transmitting the compressed feedback from the first communication device to the second communication device to enable the second communication device to steer at least one subsequent transmission to the first communication device.

In other embodiments, the method also includes one of, or any suitable combination of two or more of, the following features.

The method further includes deriving, at the first communication device, an intermediate matrix from the channel matrix, wherein determining the compressed feedback includes decomposing the intermediate matrix.

Determining the intermediate matrix comprises determining a product of the channel matrix and a Hermitian transpose of the channel matrix.

Determining the intermediate matrix comprises performing an initial QR decomposition of the channel matrix to obtain an initial Q matrix and an initial R matrix, wherein a conjugate transpose of the intermediate matrix is the initial R matrix.

Decomposing the intermediate matrix comprises performing QR decomposition of the intermediate matrix to determine a Q matrix and an R matrix.

The method further includes, for each of one or more stages of the QR decomposition, determining norm values corresponding to columns of a sub-matrix of the R matrix to be processed in the stage of the QR decomposition.

The method further includes, for each of one or more stages of the QR decomposition, prior to performing QR decomposition of the sub-matrix, sorting columns of the sub-matrix such that a column corresponding to a highest norm value among the determined norm values is the first column of the sub-matrix.

Determining norm values for a second stage of the QR decomposition comprises updating norm values previously determined for a first stage of the QR decomposition, wherein the first stage of the QR decomposition is performed prior to the second stage of the QR decomposition.

The method further includes, for each of one or more stages of the QR decomposition, dynamically scaling elements of a sub-matrix of the R matrix to be processed in the stage of the QR decomposition, including one of i) dynamically scaling the elements based on an absolute value of a largest one of a) real parts and b) imaginary parts of the elements of the sub-matrix such that a leading bit of the absolute value is a logic 1 and ii) dynamically scaling the elements based on a largest norm value among norm values corresponding to columns of the sub-matrix such that a leading bit of the largest norm value is a logic 1.

Determining the compressed feedback includes performing multiple iterations of QR decomposition, including performing an initial iteration of the multiple iterations on the intermediate matrix.

The method further includes, for each of one or more iterations of QR decomposition subsequent to the initial iteration of QR decomposition, determining a product of the intermediate matrix and a Q matrix resulting from a previous iteration of QR decomposition, including determining the product by applying QR decomposition directly to the scaled intermediate matrix during the previous iteration of QR decomposition.

In another embodiment, a first communication device comprises a network interface device having one or more integrated circuits configured to: receive a plurality of training signals from a second communication device via a communication channel; determine, based on the plurality of training signals, a channel matrix corresponding to the communication channel; determine, based on the channel matrix, compressed feedback to be provided to the second communication device, wherein determining the compressed feedback does not include decomposing a steering matrix; and transmit the compressed feedback to the second communication device to enable the second communication device to steer at least one subsequent transmission to the first communication device.

In other embodiments, the first communication device also comprises one of, or any suitable combination of two or more of, the following features.

The one or more integrated circuits are further configured to derive an intermediate matrix from the channel matrix.

Determining the compressed feedback includes decomposing the intermediate matrix.

The one or more integrated circuits are configured to determine the intermediate matrix at least by determining a product of the channel matrix and a Hermitian transpose of the channel matrix.

The one or more integrated circuits are configured to determine the intermediate matrix at least by performing an initial QR decomposition of the channel matrix to obtain an initial Q matrix and an initial R matrix, wherein a conjugate transpose of the intermediate matrix is the initial R matrix.

The one or more integrated circuits are configured to decompose the intermediate matrix at least by performing QR decomposition of the intermediate matrix to determine a Q matrix and an R matrix.

The one or more integrated circuits are further configured to, for each of one or more stages of the QR decomposition, determine norm values corresponding to columns of a sub-matrix of the R matrix to be processed in the stage of the QR decomposition, The one or more integrated circuits are further configured to, for each of one or more stages of the QR decomposition, prior to performing QR decomposition of the sub-matrix, sort columns of the sub-matrix such that a column corresponding to a highest norm value among the determined norm values is the first column of the sub-matrix.

The one or more integrated circuits are configured to determine norm values for a second stage of the QR decomposition at least by updating norm values previously determined for a first stage of the QR decomposition, wherein the first stage of the QR decomposition is performed prior to the second stage of the QR decomposition.

The one or more integrated circuits are further configured to, for each of one or more stages of the QR decomposition, dynamically scale elements of a sub-matrix of the R matrix to be processed in the stage of the QR decomposition, including one of i) dynamically scaling the elements based on an absolute value of a largest one of a) real parts and b) imaginary parts of the elements of the sub-matrix such that a leading bit of the absolute value is a logic 1 and ii) dynamically scaling the elements based on a largest norm value among norm values corresponding to columns of the sub-matrix such that a leading bit of the largest norm value is a logic 1.

The one or more integrated circuits are configured to determine the compressed feedback at least by performing multiple iterations of QR decomposition, including performing an initial iteration of the multiple iterations on the intermediate matrix.

The one or more integrated circuits are further configured to, for each of one or more iterations of QR decomposition subsequent to the initial iteration of QR decomposition, determine a product of the intermediate matrix and a Q matrix resulting from a previous iteration of QR decomposition, including determining the product by applying QR decomposition directly to the scaled intermediate matrix during the previous iteration of QR decomposition.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for providing beamforming information in a communication channel, the method comprising:
    calculating, at a first communication device, an initial matrix from an estimate of the communication channel;
    performing, at the first communication device, a matrix decomposition of the initial matrix to decompose the initial matrix into a plurality of decomposition matrices, wherein performing the matrix decomposition comprises determining angles for rotation operations performed on the initial matrix as part of decomposing the initial matrix, and wherein determining angles for rotation operations performed on the initial matrix comprises:
        determining first angles for first rotation operations performed on rows of the initial matrix as part of performing the matrix decomposition, and
        determining second angles for second rotation operations performed on columns of the initial matrix as part of performing the matrix decomposition;
    determining, at the first communication device, compressed feedback using the angles that were determined as part of decomposing the initial matrix into the plurality of decomposition matrices, including using i) the first angles that were determined as part of decomposing the initial matrix into the beamforming steering matrix, and ii) the second angles that were determined as part of decomposing the initial matrix into the beamforming steering matrix, wherein the compressed feedback is a compressed representation of a beamforming steering matrix corresponding to the estimate of the communication; and
    transmitting, by the first communication device, the compressed feedback to a second communication device to enable the second communication device to beamform at least one subsequent transmission to the first communication device.

2. The method of claim 1, wherein:
    the first angles are determined as phase rotations performed on rows of different submatrices of the initial matrix to transform elements of columns of the submatrices to positive real numbers; and
    the second angles are determined to correspond to Givens rotations performed on columns of the different submatrices to transform elements of columns of the submatrices to zero.

3. The method of claim 1, further comprising:
    determining, at the first communication device, a channel estimate matrix H corresponding to the estimate of the communication channel; and
    calculating, at the first communication device, the initial matrix using H.

4. The method of claim 3, wherein determining the initial matrix comprises determining a product of H and a Hermitian transpose of H.

5. The method of claim 3, further comprising:
    receiving, at the first communication device, a plurality of training signals from the second communication device via the communication channel; and
    determining, at the first communication device, the estimate of the communication channel based on receiving the plurality of training signals.

6. The method of claim 1, wherein:
    performing the matrix decomposition of the initial matrix comprises performing multiple iterations of a matrix decomposition algorithm, the multiple iterations including a last occurring iteration;
    each iteration of the matrix decomposition algorithm includes determining a respective set of angles for rotation operations performed on a corresponding matrix during the iteration; and
    determining the compressed feedback includes using the set of angles that were determined as part of the last occurring iteration.

7. The method of claim 1, wherein decomposing the initial matrix comprises performing QR decomposition of the initial matrix to determine an orthogonal Q matrix and an upper triangular R matrix.

8. The method of claim 1, wherein the matrix decomposition of the initial matrix is performed so that a product of the plurality of decomposition matrices equals the initial matrix.

9. The method of claim 1, wherein performing the matrix decomposition of the initial matrix comprises:
determining norm values corresponding to columns of submatrices of the initial matrix; and
sorting columns of the submatrices using the norm values.

10. A first communication device, comprising:
a network interface device having one or more integrated circuits (ICs) configured to:
calculate an initial matrix from an estimate of a communication channel,
perform a matrix decomposition of the initial matrix to decompose the initial matrix into a plurality of decomposition matrices, wherein performing the matrix decomposition comprises determining angles for rotation operations performed on the initial matrix as part of decomposing the initial matrix, and wherein determining angles for rotation operations performed on the initial matrix comprises:
determining first angles for first rotation operations performed on rows of the initial matrix as part of performing the matrix decomposition, and
determining second angles for second rotation operations performed on columns of the initial matrix as part of performing the matrix decomposition;
wherein the one or more ICs are further configured to:
determine compressed feedback using the angles that were determined as part of decomposing the initial matrix into the plurality of decomposition matrices, including using i) the first angles that were determined as part of decomposing the initial matrix into the beamforming steering matrix, and ii) the second angles that were determined as part of decomposing the initial matrix into the beamforming steering matrix, wherein the compressed feedback is a compressed representation of a beamforming steering matrix corresponding to the estimate of the communication channel; and
wherein the one or more ICs are further configured to:
transmit the compressed feedback to a second communication device to enable the second communication device to beamform at least one subsequent transmission to the first communication device.

11. The first communication device of claim 10, wherein the one or more ICs are further configured to:
determine the first angles as phase rotations performed on rows of different submatrices of the initial matrix to transform elements of columns of the submatrices to positive real numbers; and
determine the second angles to correspond to Givens rotations performed on columns of the different submatrices to transform elements of columns of the submatrices to zero.

12. The first communication device of claim 10, wherein the one or more ICs are further configured to:
determining, at the first communication device, a channel estimate matrix H corresponding to the estimate of the communication channel; and
calculating, at the first communication device, the initial matrix using H.

13. The first communication device of claim 12, wherein the one or more ICs are further configured to:
determine the initial matrix as a product of H and a Hermitian transpose of H.

14. The first communication device of claim 12, wherein the one or more ICs are further configured to:
receive a plurality of training signals from the second communication device via the communication channel; and
determine the estimate of the communication channel based on receiving the plurality of training signals.

15. The first communication device of claim 10, wherein:
the one or more ICs are further configured to perform the matrix decomposition of the initial matrix by performing multiple iterations of a matrix decomposition algorithm, the multiple iterations including a last occurring iteration;
each iteration of the matrix decomposition algorithm includes determining a respective set of angles for rotation operations performed on a corresponding matrix during the iteration; and
the one or more ICs are further configured to determine the compressed feedback using the set of angles that were determined as part of the last occurring iteration.

16. The first communication device of claim 10, wherein the one or more ICs are further configured to decompose the initial matrix by performing a QR decomposition of the initial matrix to determine an orthogonal Q matrix and an upper triangular R matrix.

17. The first communication device of claim 10, wherein the one or more ICs are further configured to perform the matrix decomposition of the initial matrix so that a product of the plurality of decomposition matrices equals the initial matrix.

18. The first communication device of claim 10, wherein the one or more ICs are further configured to, as part of performing the matrix decomposition of the initial matrix:
determine norm values corresponding to columns of submatrices of the initial matrix; and
sort columns of the submatrices using the norm values.

19. The first communication device of claim 10, wherein the network interface device comprises one or more wireless transceivers implemented on the one or more ICs.

20. The first communication device of claim 19, further comprising:
one or more antennas coupled to the one or more transceivers.

* * * * *